United States Patent
Imbert et al.

(10) Patent No.: US 8,142,266 B2
(45) Date of Patent: Mar. 27, 2012

(54) THRESHING SYSTEM INCLUDING THRESHING ELEMENTS HAVING OPENINGS FOR GRAIN PASSAGE

(75) Inventors: Jean Imbert, Etampes (FR); Clinton T. Baltz, Lancaster, PA (US); Wayne T. Flickinger, Oxford, PA (US); Herbert M. Farley, Elizabethtown, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/885,967

(22) Filed: Sep. 20, 2010

(65) Prior Publication Data

US 2011/0070933 A1      Mar. 24, 2011

Related U.S. Application Data

(60) Provisional application No. 61/277,015, filed on Sep. 18, 2009.

(51) Int. Cl.
*A01F 7/06* (2006.01)
*B02B 3/06* (2006.01)

(52) U.S. Cl. ........................................ 460/66
(58) Field of Classification Search ............... 460/68, 460/66, 69, 70, 71, 72, 112
See application file for complete search history.

(56) References Cited

U.S. PATENT DOCUMENTS

| | | | |
|---|---|---|---|
| 5,588 A | 5/1848 | Warren | |
| 324,063 A | 8/1885 | Wollnough | |
| 3,203,428 A * | 8/1965 | Ausherman | 460/71 |
| 3,297,037 A | 1/1967 | Ausherman | |
| 3,306,302 A | 2/1967 | Mark et al. | |
| 4,136,704 A * | 1/1979 | Dyke | 460/68 |
| 4,192,322 A * | 3/1980 | Wilson | 460/70 |
| 4,248,248 A * | 2/1981 | De Busscher et al. | 460/68 |
| 4,422,463 A * | 12/1983 | West | 460/67 |
| 4,505,279 A * | 3/1985 | Campbell et al. | 460/66 |
| 4,889,517 A * | 12/1989 | Strong et al. | 460/66 |
| 4,936,810 A * | 6/1990 | Strong et al. | 460/69 |
| 4,946,419 A * | 8/1990 | Cromheecke et al. | 460/68 |
| 4,964,838 A * | 10/1990 | Cromheecke et al. | 460/66 |
| 5,035,675 A | 7/1991 | Dunn et al. | |
| 5,125,871 A | 6/1992 | Gorden | |
| 5,192,246 A * | 3/1993 | Francis et al. | 460/72 |
| 5,427,573 A | 6/1995 | Rutt et al. | |
| 5,919,086 A * | 7/1999 | Derry | 460/72 |
| 6,190,252 B1* | 2/2001 | Makeeff | 460/69 |
| 6,261,176 B1* | 7/2001 | Welch | 460/72 |
| 6,325,714 B1 | 12/2001 | Tanis et al. | |
| 6,494,782 B1* | 12/2002 | Strong et al. | 460/71 |

(Continued)

FOREIGN PATENT DOCUMENTS

JP      11-168959      6/1991

(Continued)

*Primary Examiner* — Arpad Fabian-Kovacs
(74) *Attorney, Agent, or Firm* — Michael G. Harms

(57) ABSTRACT

A threshing system for an agricultural harvester including a plurality of threshing elements supported on a rotor at spaced intervals in a generally helical pattern about an outer surface of the rotor, each threshing element including a set of discrete threshing bars including a leading threshing bar proximate the outer surface of the rotor and a succession of threshing bars located progressively farther from the outer surface forming a ramp and defining a wedge shaped opening between the threshing bars and the outer surface, each set of threshing bars extending generally axially along the rotor defining axially extending spaces therebetween sufficiently large for passage of grain therethrough to the wedge shaped opening.

20 Claims, 10 Drawing Sheets

U.S. PATENT DOCUMENTS

| | | | |
|---|---|---|---|
| 7,022,013 B1 * | 4/2006 | Van Quekelberghe et al. | 460/66 |
| 2002/0002068 A1 | 1/2002 | Welch | |
| 2007/0026913 A1 * | 2/2007 | Kuchar | 460/112 |
| 2007/0049366 A1 | 3/2007 | Pope | |
| 2009/0011807 A1 * | 1/2009 | Becker et al. | 460/59 |

FOREIGN PATENT DOCUMENTS

| | | |
|---|---|---|
| JP | 2008-136373 | 6/2008 |

\* cited by examiner

THRESHING SYSTEM INCLUDING THRESHING ELEMENTS HAVING OPENINGS FOR GRAIN PASSAGE

This application claims the benefit of U.S. Provisional Application No. 61/277,015, filed Sep. 18, 2009.

TECHNICAL FIELD

This invention relates generally to a threshing system for an agricultural harvester, and more specifically to a threshing system including a plurality of threshing elements mounted on a rotor at spaced intervals in a generally helical pattern about an outer surface of the rotor, each threshing element includes a set of discrete threshing bars with a leading threshing bar proximate the outer surface of the rotor and a succession of threshing bars located progressively farther from the outer surface forming a ramp and defining a wedge shaped opening between the threshing bars and the rotor, each set of threshing bars extends generally axially along the rotor and defines axially extending spaces therebetween sufficiently large for passage of grain therethrough to the wedge shaped opening.

BACKGROUND ART

U.S. Provisional Application No. 61/277,015, filed Sep. 18, 2009, is incorporated herein in their entirety by reference.

Most agricultural combines use a rotary threshing and/or separating system including at least one rotor drivingly rotated about a rotational axis within a rotor housing, the housing having a lower region including a perforated concave spaced radially outwardly of the rotor. The rotor will often have a frusto-conical inlet end having a helical flight or flights therearound for conveying a flow of crop material into the space between the rotor and the housing. The main body of the rotor will typically have an array or layout of threshing elements, most commonly including rasp bars and separating elements, particularly straight separator bars, which protrude radially outwardly therefrom into the space. The rasp bars and separator bars are configured differently, so as to perform different functions. The functions of the rasp bars include to cooperate with one or more vanes and guides typically disposed around the upper portion of the inner circumference of the rotor housing, for conveying a mat of the crop material along a generally helical path through the space, while cooperating with the vane or vanes and/or guides, and other aspects of the concave, e.g., bars, perforations and the like of the concave, to break up larger components of the crop material into its constituents, namely larger constituents or elements of crop residue commonly referred to as straw, which includes stalks, stems, cobs and the like, and smaller constituents which comprise the grain and smaller elements of material other than grain (MOG), in the well known manner.

Rasp bars are usually relatively narrow and generally concentrated nearer the inlet end of the rotor and include a plurality of serrations defining grooves in the threshing element. These grooves are oriented at small acute angles to, or generally aligned with, the direction of rotation of the rotor for raking or combing through the mat of crop material and uncoupling the smaller constituents from the crop material thus allowing the grain to fall through the openings in the concave. Straight separator bars, in contrast, are often longer and generally located nearer to the discharge end of the rotor and include one or more bars with at least one sharp edge extending perpendicular to the direction of rotation to plow the larger components of the crop mat and carry them away from the smaller grain and MOG.

To minimize damage to the grain it is desirable to separate the grain from the mat of crop material so it can fall through the openings in the concave as far forward in the threshing system as possible. The number and size of openings in the forward portion of the concave is limited, however, and it has been observed that some of the threshed grain travels over additional rasp bars or other threshing surfaces on the rotor prior to falling through an opening of the concave.

It has also been observed that when the relatively narrow rasp bars engage the mat of crop material, some of the larger portions, particularly ears of corn, will deflect off rather than flowing over the rasp bars. As a result the grain remains in the threshing system longer, encountering more threshing elements, risking damage to the grain, and increasing the likelihood that the cobs will break.

Accordingly, what is sought is a threshing system for an agricultural harvester including threshing elements which overcome at least one of the problems, shortcomings or disadvantages set forth above.

SUMMARY OF THE INVENTION

What is disclosed is a threshing system for an agricultural harvester including threshing elements which overcome at least one of the problems, shortcomings or disadvantages set forth above.

According to a preferred aspect of the invention, the threshing system includes a plurality of ramp shaped threshing elements supported on mounting lugs at spaced intervals in a generally helical pattern about a rotor. Each threshing element includes a set of discrete threshing bars mounted such that the threshing bars extend generally axially or at a small acute angle to a rotational axis of the rotor. Mounting the threshing elements in this orientation urges crop material traveling over the threshing bars rearward to improve overall transport of crop material through the threshing system.

Adjacent ones of the threshing bars define generally axially extending spaces therebetween which are sufficiently large to allow passage of grain therethrough. Each set of threshing bars includes a leading threshing bar proximate to an outer surface of the rotor with each successive threshing bar being located progressively farther from the outer surface forming a ramp and defining a cavity or wedge shaped opening between the threshing bars and the outer surface. When grain is uncoupled from the mat of crop material and does not directly fall through perforations of a concave in a housing surrounding the rotor, the cavity or opening between the outer surface of the rotor and the threshing bars provides an area for the threshed grain to enter until the grain can fall through the perforations of the concave. As a result, the threshed grain that does not directly fall through the concave is less likely to be carried along with the mat of crop material and over additional threshing elements, thus reducing the risk of damage to the grain.

According to a preferred feature of the invention, the threshing elements are situated on a forward portion of the rotor to facilitate threshing and separation near the forward end of the threshing system.

According to a preferred aspect of the invention, the threshing bars comprise cylindrical projections. Cylindrical projections, in contrast to known straight separator bars with sharp edges, urge the mat of crop material toward the concave and housing by allowing the mat of crop material to roll over the cylindrical projections thus lessening the risk of damage to the grain.

According to another preferred aspect of the invention, the threshing bars comprise both cylindrical projections as well as straight bars. This aspect of the invention provides some of the separation capability of known straight separator bars at an earlier stage of the threshing process while the cylindrical projections lessen the risk of damage to the grain.

According to another preferred embodiment of the invention, each threshing element is supported on at least two mounting lugs such that the threshing element has a generally larger axial extent than known rasp bars. As a result, larger components of the mat of crop material that may have deflected off the narrower rasp bar will more likely flow over the threshing element. In addition, when harvesting corn, ears of corn flowing over the threshing element will tend to align with the threshing bars, resulting in improved threshing and reduced cob breakage.

Advantages of the present threshing system include, but are not limited to, improved transport of crop material through the threshing system, improved threshing, reduced cob breakage, and reduced risk of damage to the grain.

DETAILED DESCRIPTION OF THE INVENTION

Figure 1:
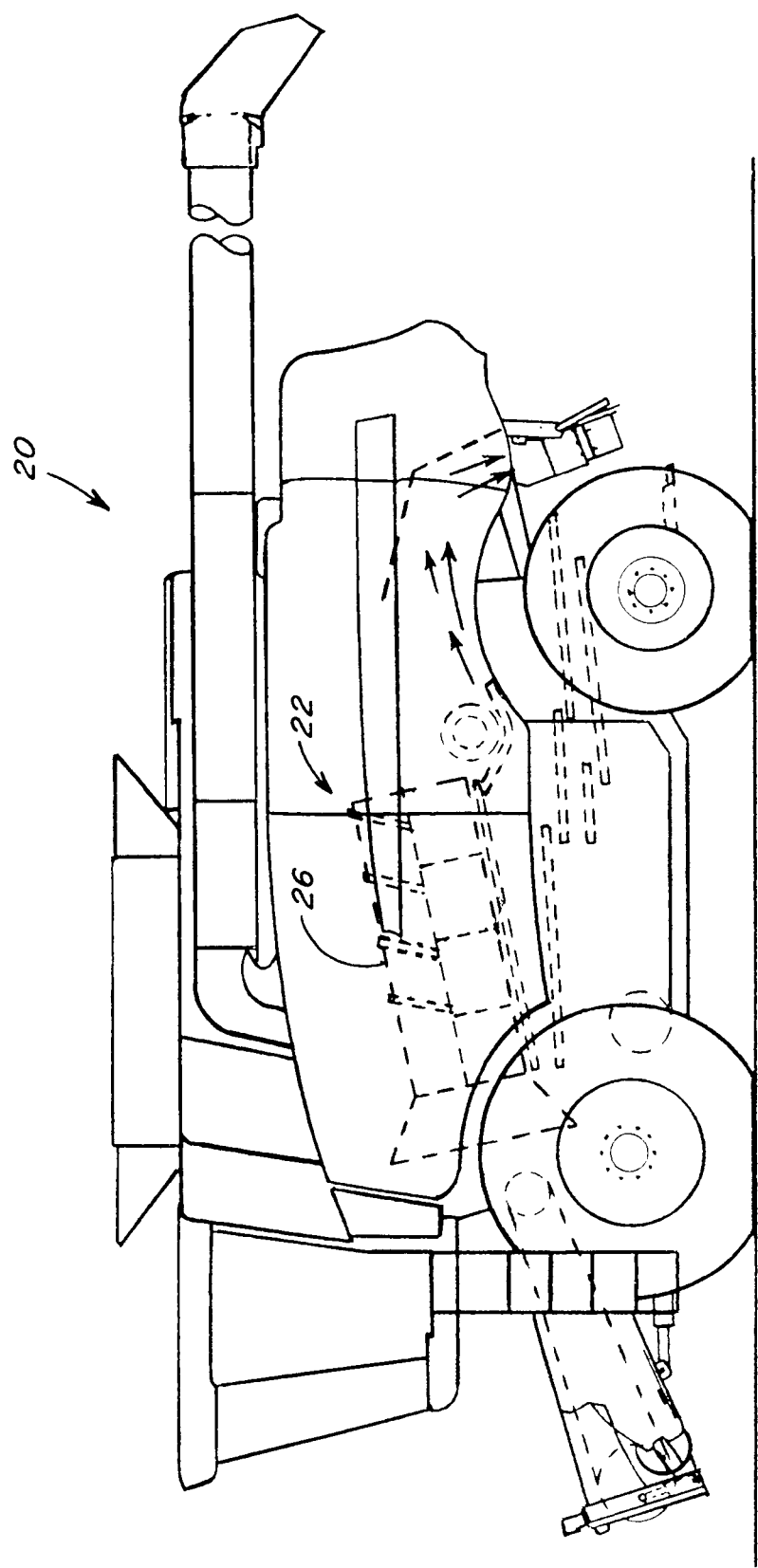
FIG. 1 is a side view of an agricultural harvester, namely a combine having a threshing system according to the present invention.

Turning now to the drawings, FIG. 1 depicts an agricultural harvester, specifically a combine 20 that is representative of an axial flow type combine including one or two fore and aft extending rotors, but it should be understood that it is contemplated that the invention can likewise be used with rotors of other types of combines, including, but not limited to, conventional types wherein one or more rotors of the invention will be mounted in a transverse orientation within a body of the combine.

Figure 2:
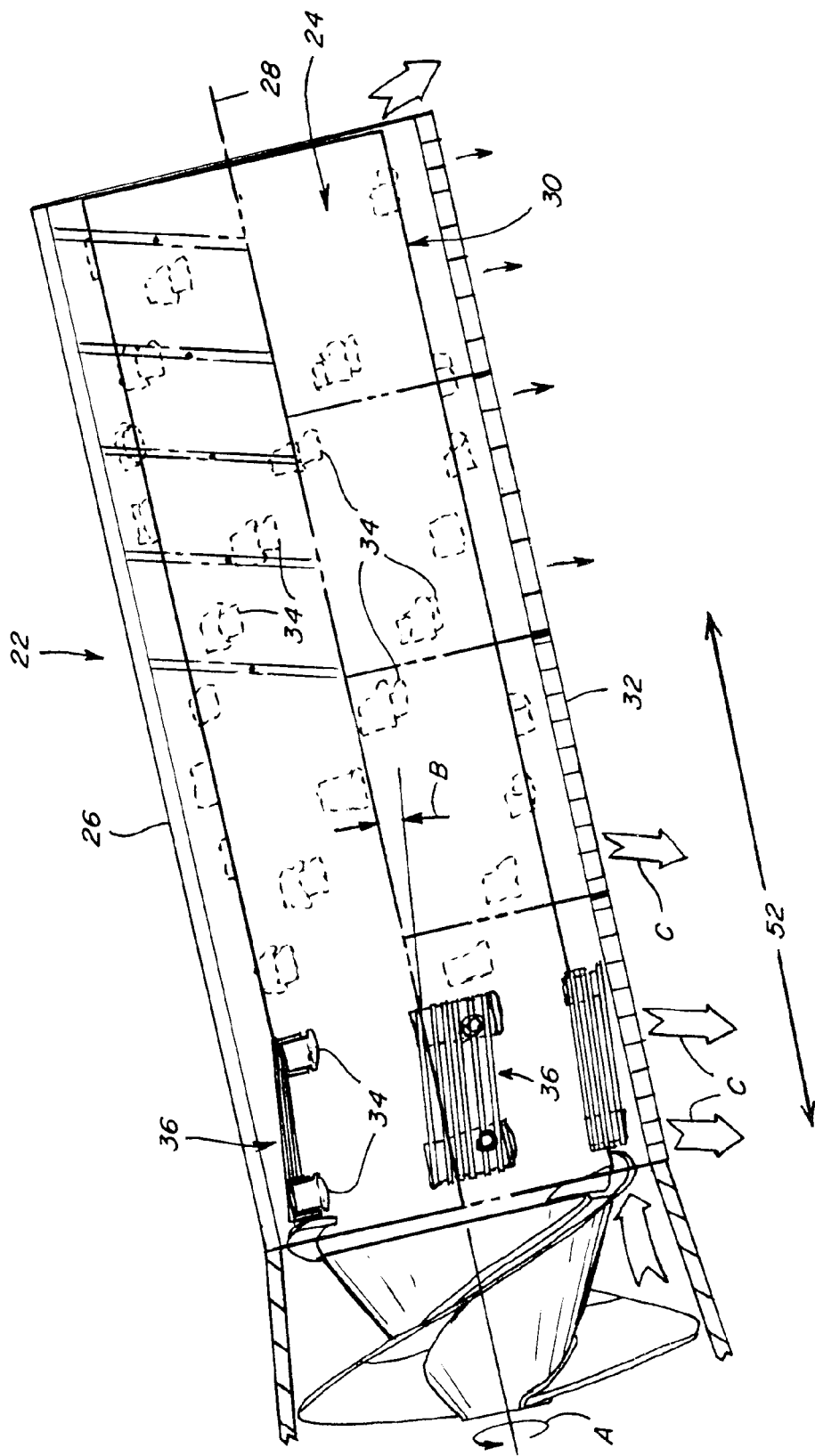
FIG. 2 is an partial perspective view of the threshing system including a housing having a concave and a rotor including threshing elements according to the invention.
Figure 3:
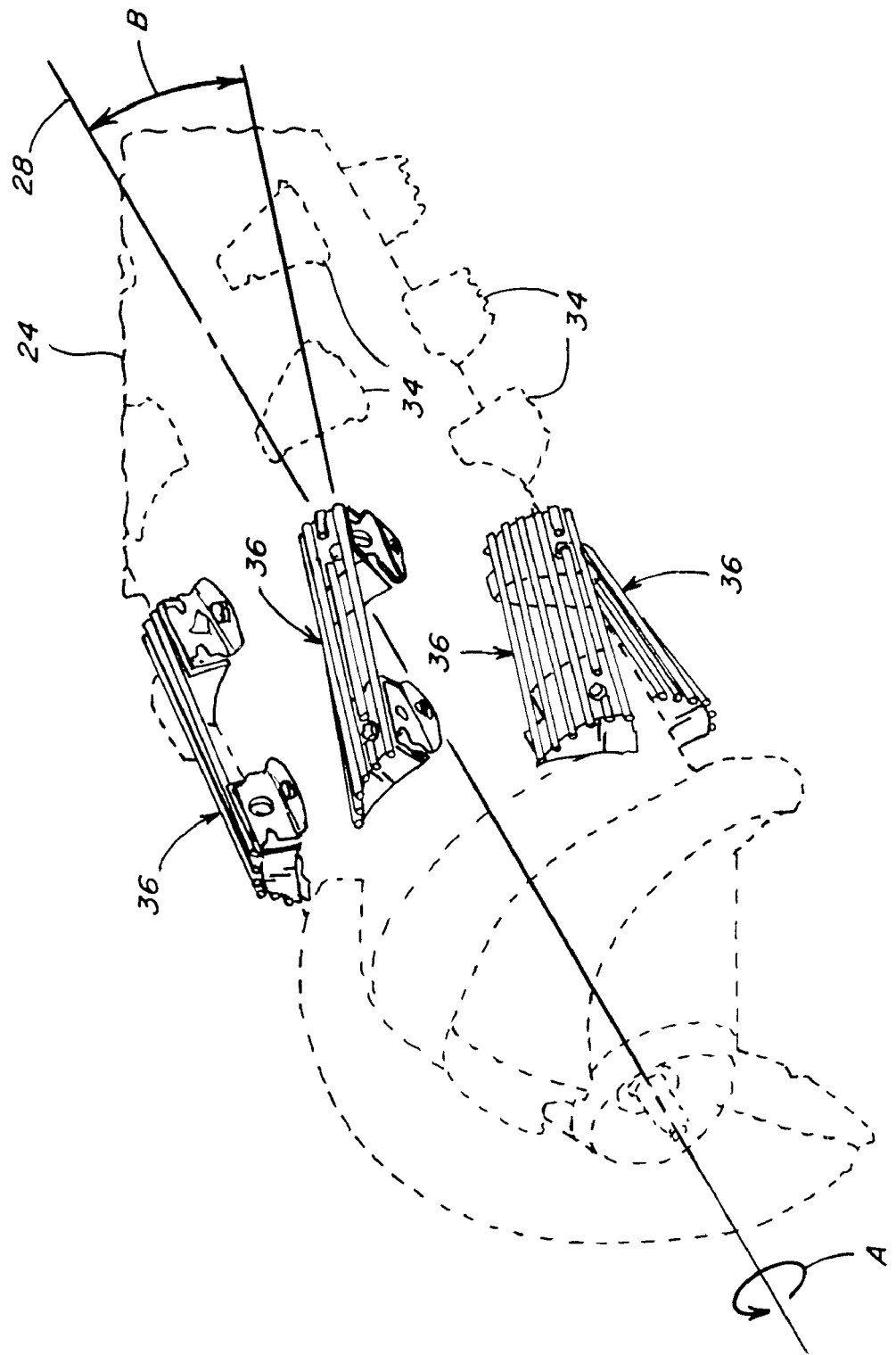
FIG. 3 is an enlarged partial view of the rotor of FIG. 2.
Figure 4:
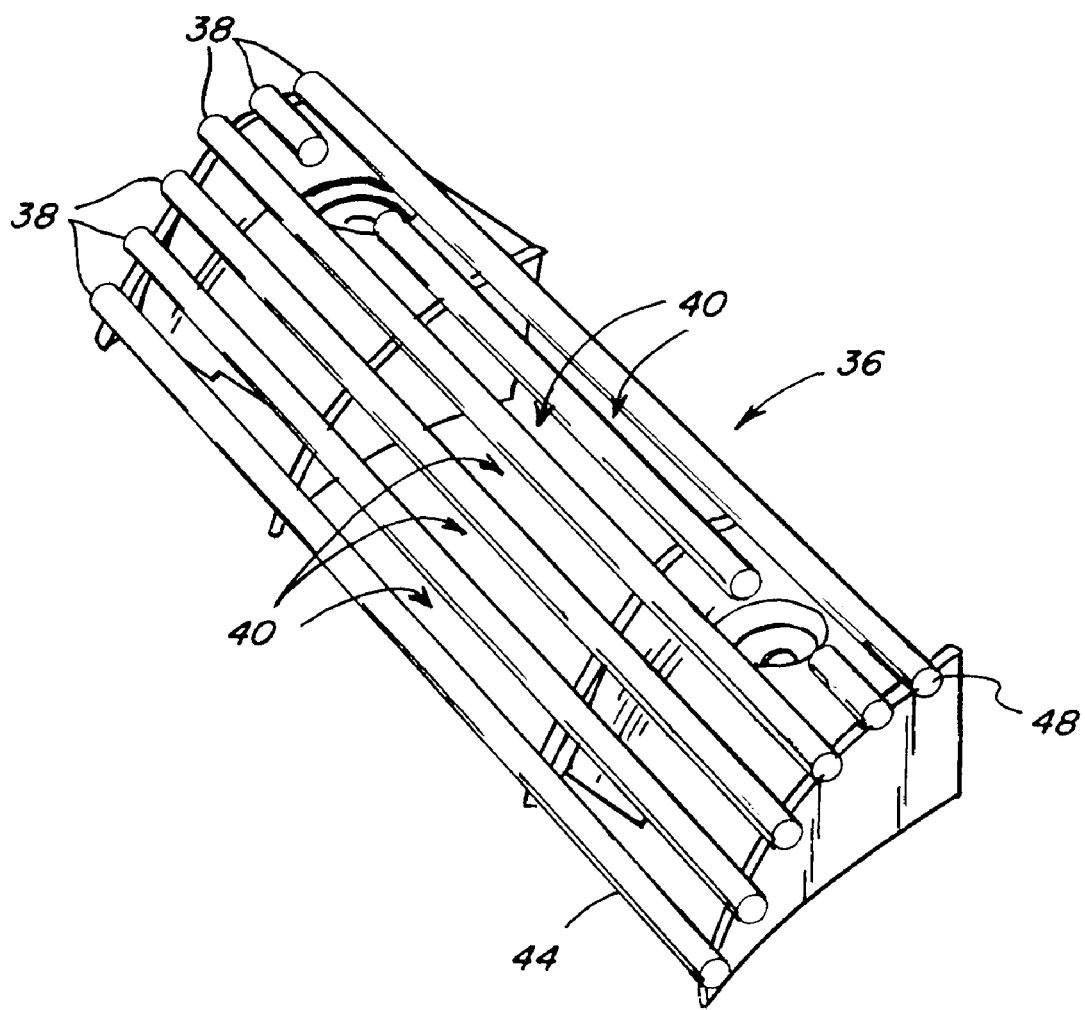
FIG. 4 is a perspective view of a preferred embodiment of a threshing element of the present invention.
Figure 5:
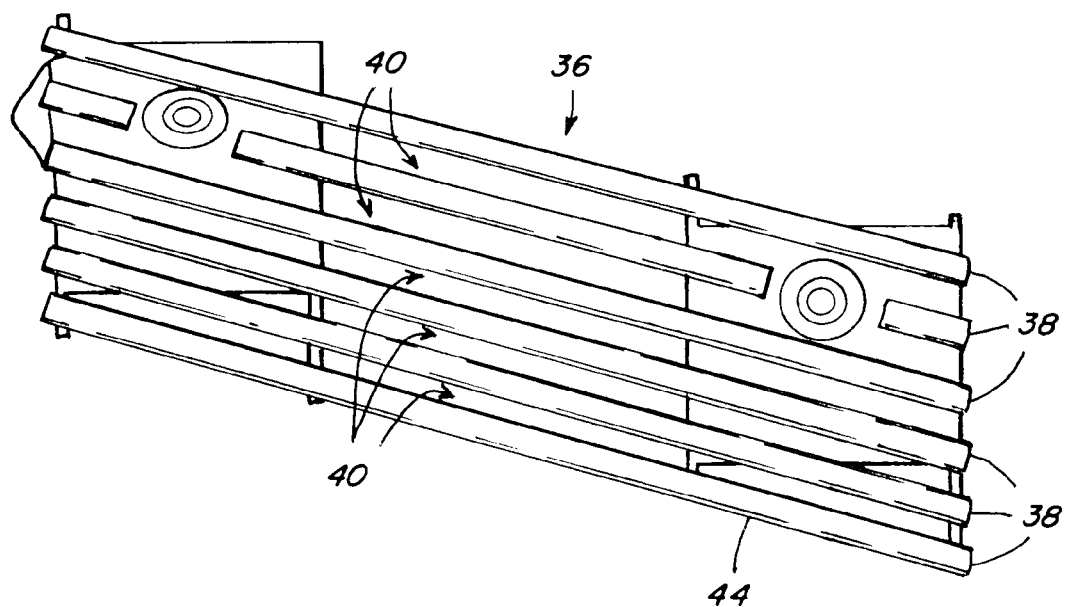
FIG. 5 is a top view of the preferred embodiment of a threshing element of the present invention.

Threshing system 22 includes a body, specifically a rotor 24, as shown in FIG. 2, supported within a housing 26 for rotation in a direction of rotation depicted by arrow A about a rotational axis 28 through rotor 24. Rotor 24 has an outer circumferential surface 30 spaced radially inwardly of a perforated concave 32 of housing 26 and includes a plurality of mounting lugs 34 disposed at discrete locations about rotor 24 that project radially outwardly toward concave 32, As seen in FIGS. 2 and 3, threshing system 22, according to the invention, includes a plurality of ramp shaped threshing elements 36 supported on mounting lugs 34 at spaced intervals in a generally helical pattern about rotor 24. Each threshing element 36 includes a set of discrete threshing bars 38 as shown in FIGS. 4 and 5. Threshing element 36 is mounted such that threshing bars 38 extend generally axially or at a small acute angle to the rotational axis, depicted as angle B, along rotor 24. Mounting threshing element 36 in this manner urges crop material traveling over threshing bars 38 rearward to improve transport of crop material through threshing system 22.

Figure 6:
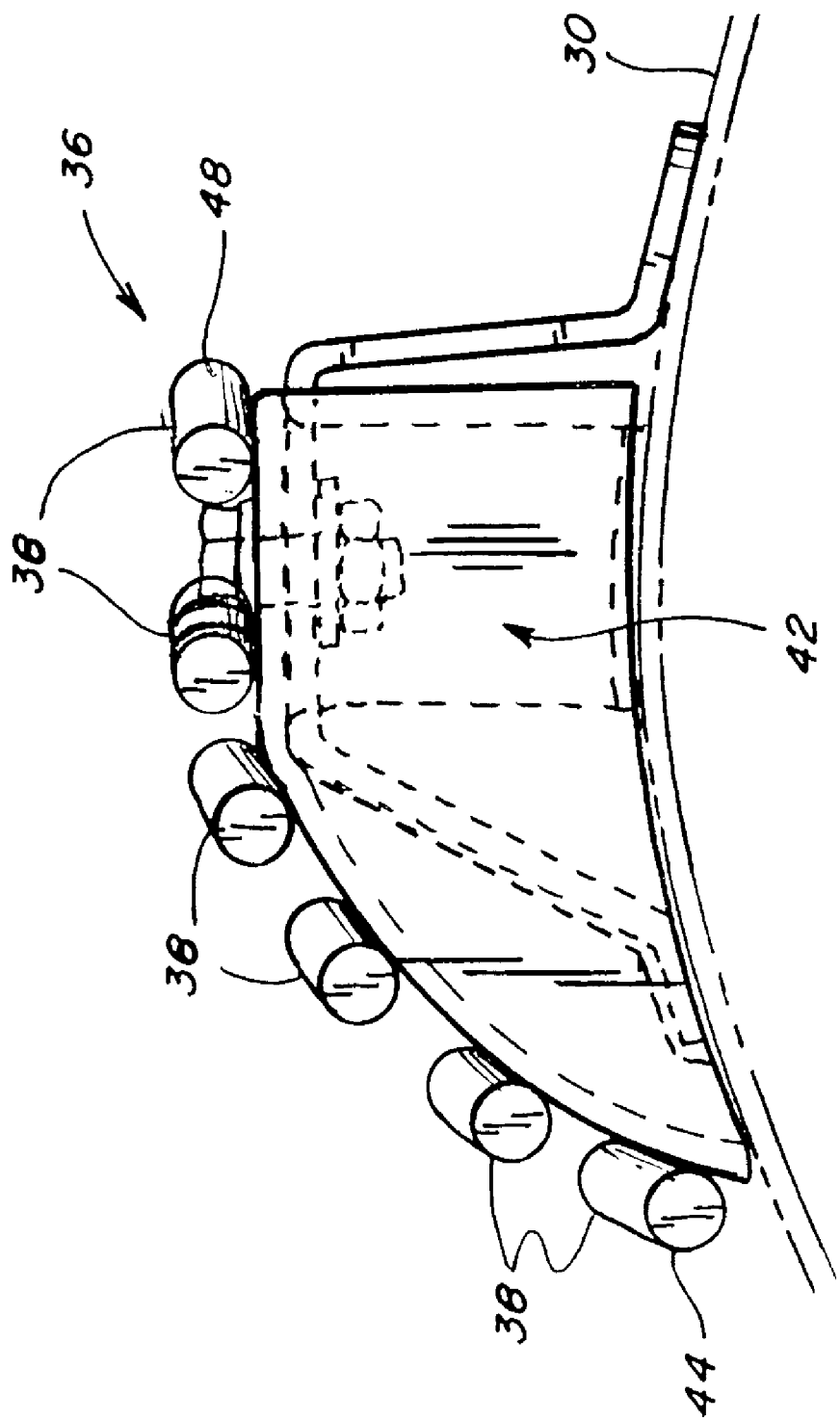
FIG. 6 is a side perspective view of the preferred embodiment of a threshing element of the present invention.

Adjacent threshing bars 38 define generally axially extending spaces 40 therebetween which are sufficiently large to allow passage of grain therethrough. Turning now also to FIG. 6, each set of threshing bars 38 includes a leading threshing bar 44 proximate outer surface 30 of rotor 24 and each successive threshing bar is located progressively farther from outer surface 30 forming a ramp and defining a cavity or wedge shaped opening 42 between threshing bars 38 and outer surface 30. When grain is uncoupled from the mat of crop material and does not directly fall through the perforations of concave 32, cavity or opening 42 provides an area for the threshed grain to enter until the grain can fall through the perforations of concave 32. As a result, the threshed grain that does not directly fall through concave 32 is less likely to be carried along with the mat of crop material to additional threshing elements, thus reducing the risk of damage to the grain.

According to a feature of the invention, threshing elements 36 are situated on a forward portion 52 of rotor 24 to facilitate threshing and separation near the forward end of threshing system 22.

According to a preferred aspect of the invention, threshing bars 38 comprise cylindrical projections 48 as shown in FIGS. 3-6. Cylindrical projections 48, in contrast to known straight separator bars with sharp edges, urge the mat of crop material toward concave 32 and housing 26 by allowing the mat of crop material to roll over the cylindrical projections 48 thus lessening the risk of damage to the grain.

Figure 7:
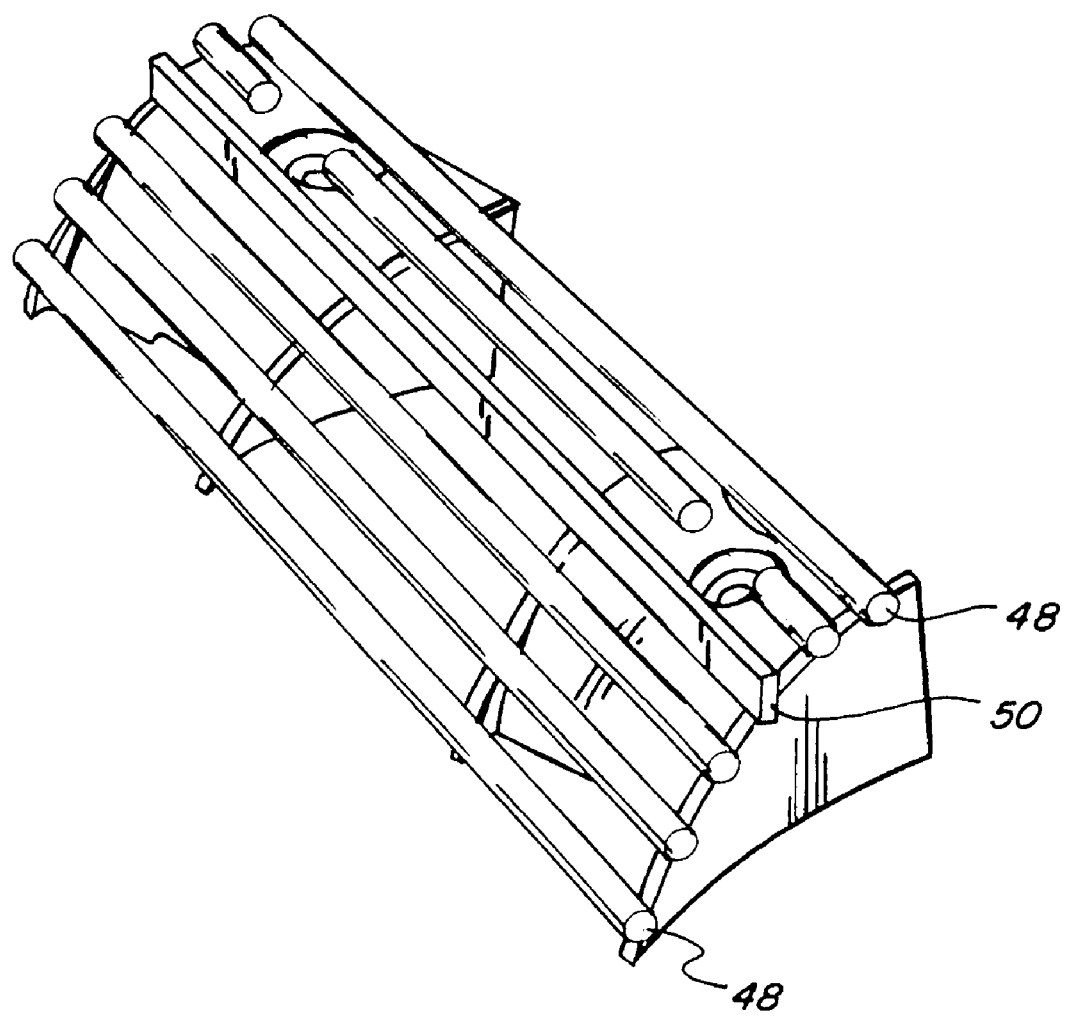
FIG. 7 is a perspective view of another preferred embodiment of a threshing element of the present invention.

According to another preferred aspect of the invention, threshing bars 38 comprise both cylindrical projections 48 as well as straight bars 50 as shown in FIG. 7. This aspect of the invention provides some of the separation capability of known straight separator bars at an earlier stage of the threshing process while cylindrical projections 48 lessen the risk of damage to the grain.

Figure 8:
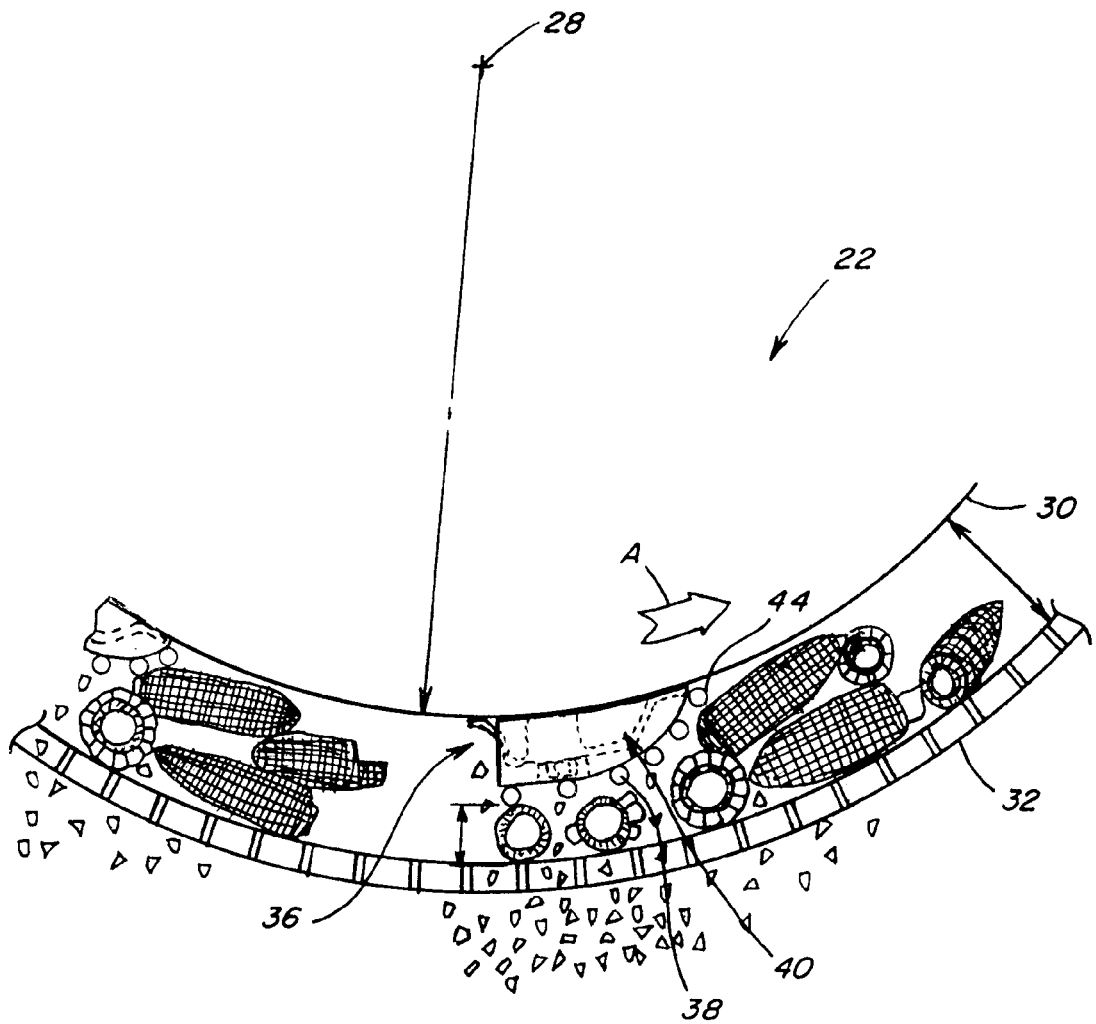
FIG. 8 is a partial side view of the threshing system showing cooperation between the threshing element and the concave.
Figure 9:
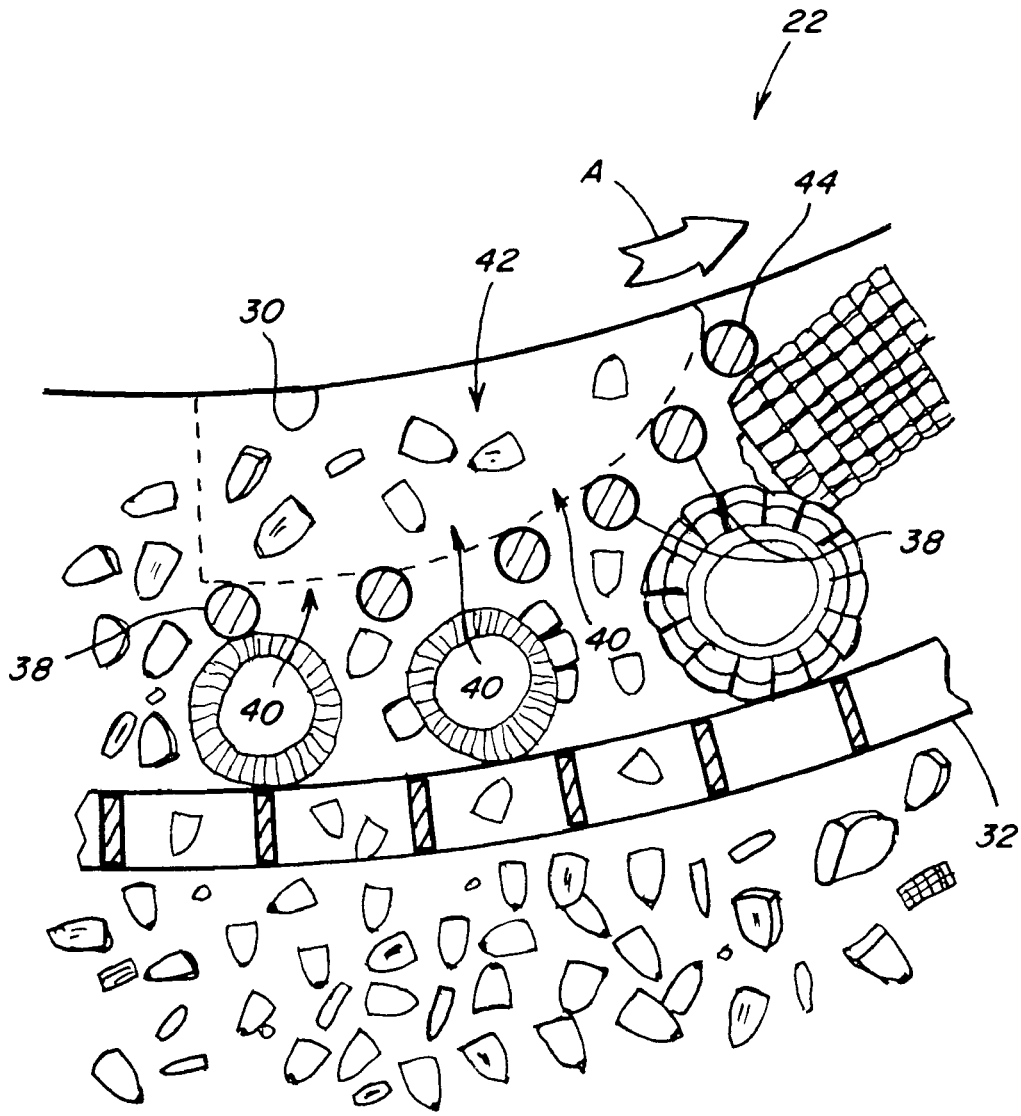
FIG. 9 is an enlarged side view of threshing element and the concave interaction.
Figure 10:
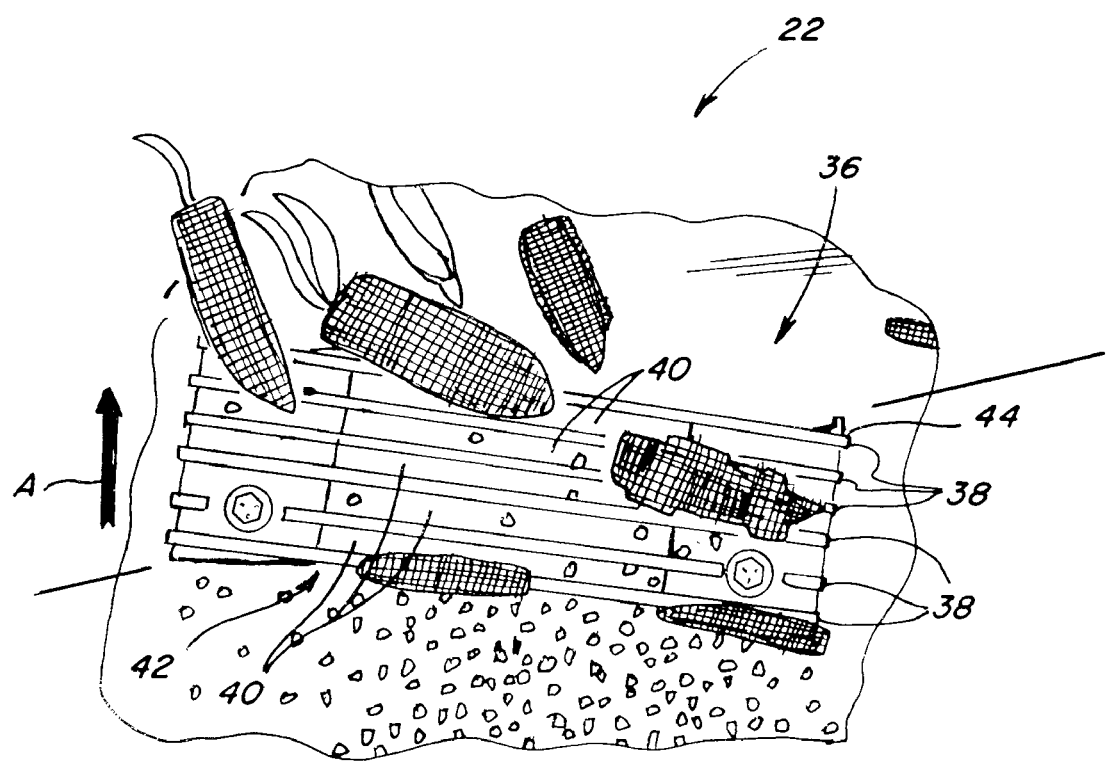
FIG. 10 is an enlarged perspective view of the threshing element.

According to another preferred embodiment of the invention, each threshing element 36 is supported on at least two mounting lugs 34 such that threshing element 36 has a generally larger axial extent than known rasp bars. As a result, larger components of the mat of crop material that may have deflected off the narrower rasp bar will more likely flow over threshing element 36. In addition, when harvesting corn, for example, as the ears of corn flow over threshing element 36, they tend to align with threshing bars 38 as seen in FIGS. 8-10. This alignment results in improved threshing and reduced cob breakage.

Regarding FIGS. 8-10, several advantages of the present threshing system can be explained with reference to a mat of crop material represented by ears of corn. The ears of corn enter threshing system 22 at various orientations relative to axis of rotation 28. Threshing elements 36 are mounted with discrete cylindrical threshing bars 38 extending generally in alignment with, or at a small acute angle B relative to, axis 28. In addition, threshing bars 38 are positioned relative to outer surface 30 of rotor 24 to form a ramp leaving cavity or opening 42 between outer surface 30 and threshing bars 38. Adjacent pairs of threshing bars 38 define generally axially extending spaces 40 therebetween to allow passage of threshed corn through spaces 40 into cavity or opening 42. In operation, threshing element 36 will engage the ears of corn at the bottom of a ramp formed by threshing bars 38, or more specifically at leading threshing bar 44. Rather than be deflected between narrower rasp bars, the ears will tend to roll along and align with threshing bars 38 as the ramp guides the ears radially outwardly toward housing 26 and concave 32. The alignment of the ears of corn with threshing bars 38 improves threshing so that most of the corn will separate from the aligned ears of corn with reduced cob breakage. Much of the threshed corn will fall through the perforations of concave 32, but at least some of the threshed corn will not fall directly through concave 32 due to crowding over the perforations, separating from the cob with a sideways angular velocity, or the like. This threshed corn will pass through spaces 40 between threshing bars 38 and enter cavity or opening 42 as rotor 24 rotates. Because the threshed grain can enter opening 42, it is less likely to be carried over additional threshing elements as the remaining ears continue through threshing system 22, reducing the risk of damage to the corn.

In light of all the foregoing, it should thus be apparent to those skilled in the art that there has been shown and described a threshing system including threshing elements having openings for grain passage. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A threshing system for an agricultural combine, comprising:
    a body supported for rotation in a direction of rotation about a rotational axis therethrough, the body having an outer circumferential surface including a plurality of mounting lugs disposed at discrete locations thereabout and at spaced intervals in a generally helical pattern about the body, wherein the mounting lugs have an inclined surface; and
    a plurality of threshing elements comprising a set of discrete threshing bars extending generally axially or at a small acute angle to the rotational axis and supported on at least two adjacent mounting lugs, each threshing bar is mounted on the inclined surfaces of the at least two adjacent mounting lugs, each set of threshing bars including a leading threshing bar proximate the outer surface of the body and a succession of threshing bars arranged progressively farther from the outer surface in a radially outwardly direction, thereby forming a ramp and defining a wedge shaped opening between the threshing bars and the outer surface, adjacent ones of the threshing bars having axially extending spaces therebetween sufficiently large for passage of grain therethrough to the wedge shaped opening.

2. The threshing system of claim 1, wherein the threshing bars comprise cylindrical projections.

3. The threshing system of claim 1, wherein the threshing bars comprise cylindrical projections and straight bars.

4. The threshing system of claim 1, wherein the axially extending spaces between adjacent ones of the threshing bars allow threshed grain to enter the wedge shaped opening between the surface of the body and the ramp formed by the threshing element.

5. The threshing system of claim 2, wherein the set of threshing bars engages a mat of crop material at the leading threshing bar and the crop material rolls along the ramp formed by the set of threshing bars radially outwardly from the outer surface of the body.

6. The threshing system of claim 2, wherein the mat of crop material includes ears of corn, and the ears of corn roll along the axially extending threshing bars tending to align generally with the threshing bars.

7. The threshing system of claim 1, wherein the plurality of threshing elements are situated on a forward portion of the body.

8. A threshing system for an agricultural combine, comprising:
    a body supported within a housing for rotation in a direction of rotation about a rotational axis therethrough, the body having an outer circumferential surface including a plurality of mounting lugs disposed at discrete locations and at spaced intervals in a generally helical pattern about the body, wherein the mounting lugs have an inclined surface, the housing including an upper interior surface including vanes oriented for guiding a mat of crop material in a generally rearward helical direction and a lower surface including a perforated concave; and
    a plurality of threshing elements supported on at least two adjacent mounting lugs, each threshing bar is mounted on the inclined surfaces of the at least two adjacent mounting lugs, each threshing element including a predetermined number of generally axially extending threshing bars defining generally axially extending spaces therebetween, the threshing bars being arranged progressively farther from the outer surface in a radially outwardly direction, thereby defining a hollow ramp shape extending radially outwardly from the outer circumferential surface of the body and defining a cavity therebetween, such that the threshing elements will engage and guide the mat of crop material along the ramp, and, in cooperation with the housing, uncouple grain from the mat of crop material, allowing the grain to pass through the axially extending spaces and enter the hollow cavity as the mat of crop material moves in the generally rearward helical direction.

9. The threshing system of claim 8, wherein the threshing bars comprise cylindrical projections.

10. The threshing system of claim 8, wherein the threshing bars comprise cylindrical projections and straight bars.

11. The threshing system of claim 8, wherein the axially extending spaces between adjacent ones of the threshing bars allow threshed grain to enter the cavity between the surface of the body and the ramp shape defined by the threshing bars.

12. The threshing system of claim 9, wherein the set of threshing bars engages a mat of crop material and the crop material rolls along the ramp formed by the set of threshing bars toward the concave.

13. The threshing system of claim 9, wherein the mat of crop material includes ears of corn, and the ears of corn roll along the axially extending threshing bars tending to align generally with the threshing bars.

14. The threshing system of claim 8, wherein the plurality of threshing elements are situated on a forward portion of the body.

15. A threshing system for an agricultural combine, comprising:
   a body supported within a housing for rotation in a direction of rotation about a rotational axis through the body, the body having an outer circumferential surface spaced radially inwardly and rotatable about the rotational axis relative to a perforated concave of the housing and including a plurality of mounting lugs disposed at discrete locations about the body and projecting radially outwardly toward the concave, wherein the mounting lugs are arranged at spaced intervals in a generally helical pattern about the body, father wherein the mounting lugs have an inclined surface; and
   a plurality of ramp shaped threshing elements supported on at least two adjacent mounting lugs, each threshing element including a set of discrete threshing bars extending generally axially or at a small acute angle to the rotational axis, along the body defining generally axially extending spaces therebetween, each threshing bar is mounted on the inclined surfaces of the at least two adjacent mounting lugs, successive ones of the threshing bars in a direction opposite to the direction of rotation being arranged progressively radially farther from the outer circumferential surface of the body, such that the threshing elements, in cooperation with the perforated concave of the housing, will engage and guide a mat of crop material radially outwardly to uncouple grain from the mat of crop material and allow the grain to pass through the spaces between the successive ones of the threshing bars.

16. The threshing system of claim 15, wherein the threshing bars comprise cylindrical projections.

17. The threshing system of claim 15, wherein the threshing bars comprise cylindrical projections and straight bars.

18. The threshing system of claim 15, wherein the axially extending spaces between adjacent ones of the threshing bars allow threshed grain to enter an opening between the surface of the body and the ramp shaped threshing element.

19. The threshing system of claim 16, the set of threshing bars engages a mat of crop material and the crop material rolls along the ramp formed by the set of threshing bars toward the concave.

20. The threshing system of claim 16, wherein the mat of crop material includes ears of corn, and the ears of corn roll along the axially extending threshing bars tending to align generally with the threshing bars.

\* \* \* \* \*